US012695074B2

(12) United States Patent
Takahashi

(10) Patent No.: US 12,695,074 B2
(45) Date of Patent: Jul. 28, 2026

(54) MASS SPECTROMETRY METHOD AND MASS SPECTROMETER

(71) Applicant: SHIMADZU CORPORATION, Kyoto (JP)

(72) Inventor: Kazuya Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 318 days.

(21) Appl. No.: 18/699,368

(22) PCT Filed: Jul. 11, 2022

(86) PCT No.: PCT/JP2022/027219

§ 371 (c)(1),
(2) Date: Apr. 8, 2024

(87) PCT Pub. No.: WO2023/062896

PCT Pub. Date: Apr. 20, 2023

(65) Prior Publication Data

US 2024/0412963 A1 Dec. 12, 2024

(30) Foreign Application Priority Data

Oct. 14, 2021 (JP) ................................ 2021-168706

(51) Int. Cl.
*H01J 49/00* (2006.01)

(52) U.S. Cl.
CPC ................................ *H01J 49/0077* (2013.01)

(58) Field of Classification Search
CPC .... H01J 49/0077; H01J 49/0068; H01J 49/00; H01J 49/0045; H01J 49/005; H01J 49/04; G01N 30/7233; G01N 27/62
(Continued)

(56) References Cited

U.S. PATENT DOCUMENTS

2016/0372311 A1 12/2016 Takahashi et al.
2020/0111654 A1 4/2020 Takahashi et al.
(Continued)

FOREIGN PATENT DOCUMENTS

WO 2015/133259 A1 9/2015
WO 2018/186286 A1 10/2018
(Continued)

OTHER PUBLICATIONS

First Office Action dated Sep. 4, 2024 issued for the corresponding Japanese Patent Application No. 2023-554264.
(Continued)

*Primary Examiner* — Kiet T Nguyen
(74) *Attorney, Agent, or Firm* — Muir Patent Law, PLLC

(57) ABSTRACT

A method for performing mass spectrometry by causing a precursor ion derived from a sample component and a radical to react in a reaction chamber 132 to generate products ion from the precursor ion, the method including: a step 6 of generating a radical from a material gas; a step 8 of introducing the radical and the precursor ion into the reaction chamber 132 in a state where an amount of electric power corresponding to a generation condition of the radical is supplied to a temperature control part 1331 provided in the reaction chamber 132; and a step 9 of separating and detecting product ions generated from the precursor ion in the reaction chamber 132 according to a mass-to-charge ratio.

6 Claims, 4 Drawing Sheets

(58) Field of Classification Search
USPC .................................................. 250/281, 282
See application file for complete search history.

(56) References Cited

U.S. PATENT DOCUMENTS

| | | | | |
|---|---|---|---|---|
| 2021/0050198 | A1 | 2/2021 | Takahashi | |
| 2022/0230861 | A1 | 7/2022 | Takahashi | |
| 2022/0260527 | A1 * | 8/2022 | Takahashi ........... | H01J 49/0072 |
| 2022/0344140 | A1 | 10/2022 | Takahashi et al. | |
| 2023/0048972 | A1 * | 2/2023 | Takahashi ............ | G01N 27/626 |

FOREIGN PATENT DOCUMENTS

| | | | |
|---|---|---|---|
| WO | 2019/155725 | A1 | 8/2019 |
| WO | 2020/240908 | A1 | 12/2020 |
| WO | 2021/053865 | A1 | 3/2021 |

OTHER PUBLICATIONS

Takahashi, Hidenori, et al. "Hydrogen Attachment/Abstraction Dissociation (HAD) of Gas-Phase Peptide Ions for Tandem Mass Spectrometry," Analytical chemistry 88.7 (2016): 3810-3816.

Written Opinion (ISA237) dated Aug. 30, 2022 for PCT application No. PCT/JP2022/027219.

* cited by examiner

Fig. 3

| RADICAL SPECIES | MATERIAL GAS | FLOW RATE | POWER AMOUNT | FIRST TIME | SECOND TIME |
|---|---|---|---|---|---|
| OXYGEN RADICAL | WATER VAPOR | F11 | P11 | Ts11 | Tf11 |
| | | F12 | P12 | Ts12 | Tf12 |
| | | F13 | P13 | Ts13 | Tf13 |
| | OXYGEN GAS | F21 | P21 | Ts21 | Tf21 |
| | | F22 | P22 | Ts22 | Tf22 |
| | | F23 | P23 | Ts23 | Tf23 |
| HYDROXYL RADICAL | WATER VAPOR | F31 | P31 | Ts31 | T31 |
| | | F32 | P32 | Ts32 | T32 |
| | | F33 | P33 | Ts33 | Tf33 |
| NITROGEN RADICAL | NITROGEN GAS | F41 | P41 | Ts41 | Tf41 |
| | | F42 | P42 | Ts42 | Tf42 |
| | | F43 | P43 | Ts43 | Tf43 |
| | DRY AIR | F51 | P51 | Ts51 | Tf51 |
| | | F52 | P52 | Ts52 | Tf52 |
| | | F53 | P53 | Ts53 | Tf53 |
| HYDROGEN RADICAL | HYDROGEN GAS | F61 | P61 | Ts61 | Tf61 |
| | | F62 | P62 | Ts62 | Tf62 |
| | | F63 | P63 | Ts63 | Tf63 |

MASS SPECTROMETRY METHOD AND MASS SPECTROMETER

TECHNICAL FIELD

The present invention relates to a mass spectrometry method and a mass spectrometer.

BACKGROUND ART

A mass spectrometry method is widely used in order to identify a polymer compound component in a sample and analyze its structure, in which an ion having a specific mass-to-charge ratio is selected as a precursor ion from ions derived from a sample component, and product ions generated by dissociating the precursor ion are separated according to their mass-to-charge ratios, and detected.

Many of polymer compounds are organic substances having a hydrocarbon chain as a main skeleton. In order to learn the characteristics of a polymer compound, it is effective to obtain information such as the presence or absence of an unsaturated bond between carbon atoms and the presence or absence of a characteristic functional group. Therefore, recently, a radical attachment dissociation method has been proposed in which radicals are attached to precursor ions derived from a sample component such as a protein or a peptide to dissociate the precursor ions at the position of specific functional groups, or radicals are attached to precursor ions derived from a sample component having a hydrocarbon chain containing an unsaturated bond between carbon atoms to dissociate the precursor ions at the position of the unsaturated bonds. For example, Patent Literatures 1 and 2 and Non Patent Literature 1 disclose that hydrogen radicals are attached to precursor ions to selectively dissociate the precursor ions at the position of peptide bonds. In addition, Patent Literatures 3 and 4 disclose that oxygen radicals or hydroxyl radicals are attached to precursor ions to selectively dissociate the precursor ions at the position of unsaturated bonds contained in hydrocarbon chains.

The efficiency of reaction between precursor ions and radicals depends on the magnitude of kinetic energy possessed by the precursor ions or the radicals. Therefore, when a reaction chamber into which the precursor ions and the radicals are introduced differs in temperature, different types and amounts of product ions are generated from reaction of the same types of precursor ions and radicals. Therefore, it has previously been attempted to generate desired product ions by heating and maintaining the reaction chamber at a predetermined temperature (for example, about 130° C.) by a heater attached to the reaction chamber. In addition, heating the reaction chamber makes it possible to inhibit contamination by attachment of sample components or substances derived from radicals to a member constituting the reaction chamber.

CITATION LIST

Patent Literature

Patent Literature 1: WO 2015/133259 A
Patent Literature 2: WO 2018/186286 A
Patent Literature 3: WO 2019/155725 A
Patent Literature 4: WO 2020/240908 A

Non Patent Literature

Non Patent Literature 1: Takahashi, Hidenori, et al. "Hydrogen Attachment/Abstraction Dissociation (HAD) of Gas-Phase Peptide Ions for Tandem Mass Spectrometry." Analytical chemistry 88.7 (2016): 3810-3816.

SUMMARY OF INVENTION

Technical Problem

Patent Literatures 2 and 3 disclose that precursor ions are trapped in an ion trap, and radicals generated by introducing a material gas into a radical generation chamber to generate plasma of the material gas are introduced into a reaction chamber (ion trap) to cause the precursor ions and the radicals to react. Patent Literature 4 discloses that while radicals generated in the same manner as described above are being introduced into a reaction chamber (collision cell), precursor ions are introduced into the collision cell to cause the precursor ions and the radicals to react. In a radical generation part that generates the plasma of the material gas as described above, a part of the material gas introduced into the radical generation chamber remains unreacted without becoming either the plasma or the radicals, and is introduced into the reaction chamber together with the radicals. Since the material gas introduced into the radical generation chamber usually has a lower temperature than the temperature in the reaction chamber, the temperature in the reaction chamber decreases by introduction of the material gas from the radical generation chamber. As a result, there is a problem that precursor ions are cooled in the reaction chamber to decrease their kinetic energy, and desired product ions cannot be generated, or even if generated, generation efficiency is reduced.

Non Patent Literature 1 discloses that a hydrogen gas is introduced into a tungsten capillary heated to a high temperature of 2000° C. and thermally decomposed to generate hydrogen radicals, and the hydrogen radicals are introduced into a reaction chamber to react with precursor ions. In this case, the reaction chamber is heated by an unreacted hydrogen gas heated to the high temperature flowing into the reaction chamber. As a result, the precursor ions in the reaction chamber are heated to increase their kinetic energy, and the precursor ions are dissociated also at positions other than the peptide bonds, which causes a problem that the generation efficiency of desired product ions is poor.

An object of the present invention is to provide a technique capable of reducing a temperature change in a reaction chamber during radical supply in an ion analyzer in which precursor ions derived from a sample component are irradiated with radicals for analysis.

Solution to Problem

One mode of the present invention made to solve the above problems is a method for performing mass spectrometry by causing a precursor ion derived from a sample component and a radical to react in a reaction chamber to generate product ions from the precursor ion, the method including:

- a step of generating a radical from a material gas;
- a step of introducing the radical and the precursor ion into the reaction chamber in a state where an amount of electric power corresponding to a generation condition of the radical is supplied to a temperature control part provided in the reaction chamber; and a step of separating and detecting product ions generated from the precursor ion in the reaction chamber according to a mass-to-charge ratio.

In addition, a mass spectrometer according to the present invention made to solve the above problems includes:

a reaction chamber into which a precursor ion is introduced;

a temperature control part provided in the reaction chamber;

a power supply part configured to supply electric power to the temperature control part;

a radical generation part configured to generate a radical from a material gas to introduce the radical into the reaction chamber;

a measurement control part configured to control operations of the power supply part and the radical generation part so as to supply, to the temperature control part, an amount of electric power corresponding to a radical generation condition in the radical generation part in a time period in which the radical is introduced into the reaction chamber;

a mass separation part configured to separate product ions generated from the precursor ion in the reaction chamber according to a mass-to-charge ratio; and an ion detection part configured to detect product ions separated by the mass separation part.

Advantageous Effects of Invention

The temperature control part is usually a heater, but may be one having both heating and cooling functions, such as one including both a Peltier element and a heater, in a case where it is necessary to cool the reaction chamber, for example, when a heated material gas is introduced into the reaction chamber. As the radical generation part, for example, one that generates radicals from plasma of the material gas or one that thermally dissociates the material gas to generate radicals may be used. The radical generation condition may include a radical generation method, a material gas supply amount, and the type of the material gas.

In the mass spectrometry method and the mass spectrometer according to the present invention, the amount of electric power corresponding to the radical generation condition is supplied to the temperature control part in the time period in which the radical is introduced into the reaction chamber into which the precursor ion is introduced. For example, in a case where a low-temperature material gas flows into the reaction chamber together with the radical, the amount of electric power supplied to the temperature control part (heater or the like) is increased. On the other hand, in a case where a material gas having a temperature higher than the above predetermined temperature flows into the reaction chamber together with the radical, the amount of electric power supplied to the temperature control part (heater or the like) is decreased. Alternatively, in a case where a material gas having a yet higher temperature flows into the reaction chamber, power is supplied to the temperature control part (e.g., the Peltier element) to cool the reaction chamber.

In the mass spectrometry method and the mass spectrometer according to the present invention, when the radical is supplied to the reaction chamber, the amount of electric power corresponding to the radical generation condition is supplied to the temperature control part to compensate for a temperature change in the reaction chamber due to the material gas flowing into the reaction chamber together with the radical. This makes it possible to reduce an undesired temperature change in the reaction chamber during radical supply.

BRIEF DESCRIPTION OF DRAWINGS

FIG. 3 is an example of heater power information used in the mass spectrometer and a mass spectrometry method of the present embodiment.

DESCRIPTION OF EMBODIMENTS

Hereinafter, an embodiment of a mass spectrometer and a mass spectrometry method according to the present invention will be described with reference to the drawings.

Figure 1:
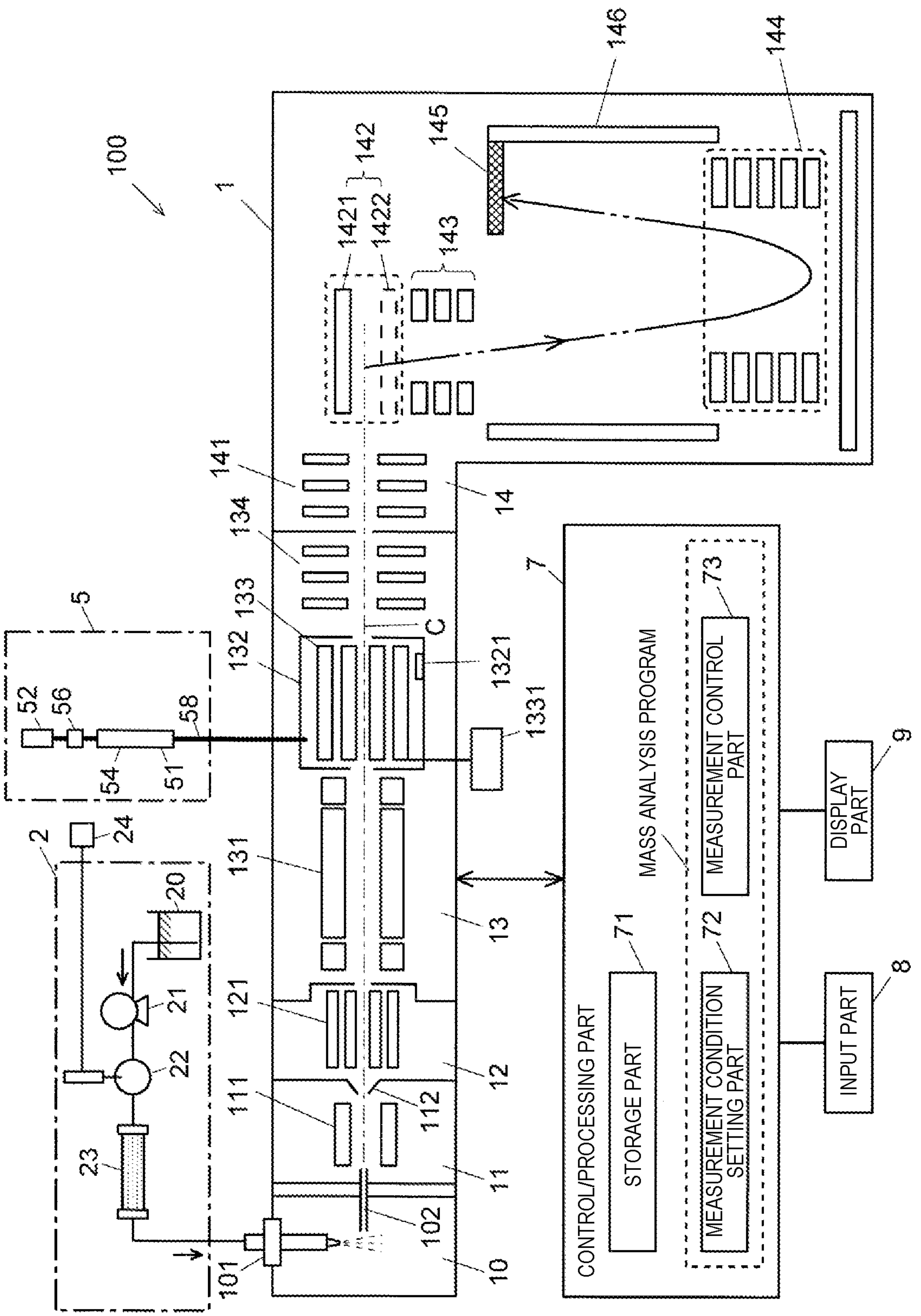
FIG. 1 is a configuration diagram of a main part of a liquid chromatograph mass spectrometer including one embodiment of a mass spectrometer according to the present invention.

FIG. 1 is a configuration diagram of a main part of a liquid chromatograph mass spectrometer 100 in which a mass spectrometer 1 of the present embodiment is combined with a liquid chromatograph 2.

The liquid chromatograph 2 includes a mobile phase container 20 that stores a mobile phase, a liquid feeding pump 21 that feeds the mobile phase, an injector 22, and a column 23. In addition, to the injector 22, an autosampler 24 that introduces a plurality of liquid samples into the injector in a predetermined order is connected.

The mass spectrometer 1 includes a main body including an ionization chamber 10 at substantially atmospheric pressure and a vacuum chamber, and a control/processing part 7. The vacuum chamber includes a first intermediate vacuum chamber 11, a second intermediate vacuum chamber 12, a third intermediate vacuum chamber 13, and an analysis chamber 14 in this order from the ionization chamber 10, and has a configuration of a multi-stage differential exhaust system with an increasing degree of vacuum in this order.

The ionization chamber 10 is provided with an electrospray ionization probe (ESI probe) 101 for nebulizing a liquid sample while imparting electric charges to the liquid sample. Sample components separated in the column 23 of the liquid chromatograph 2 are sequentially introduced into the ESI probe 101.

The ionization chamber 10 and the first intermediate vacuum chamber 11 communicate with each other through a small-diameter heated capillary 102. In the first intermediate vacuum chamber 11, an ion guide 111 including a plurality of rod electrodes is disposed so as to surround an ion optical axis C that is a central axis of a flight direction of ions. Ions having entered the first intermediate vacuum chamber 11 from the ionization chamber 10 are focused in the vicinity of the ion optical axis C by an electric field formed by the ion guide 111.

The first intermediate vacuum chamber 11 and the second intermediate vacuum chamber 12 are separated from each other by a skimmer 112 having a small hole at its top. In the second intermediate vacuum chamber 12, a plurality of rod electrodes are also disposed so as to surround the ion optical axis C. The ions having entered the second intermediate vacuum chamber 12 from the first intermediate vacuum chamber 11 are focused in the vicinity of the ion optical axis C by an electric field formed by an ion guide 121.

In the third intermediate vacuum chamber 13, there are disposed: a quadrupole mass filter 131 to separate ions according to their mass-to-charge ratios; a collision cell 132 including a multipole ion guide 133 inside; and an ion guide 134. A temperature sensor 1321 for measuring a temperature inside the collision cell 132 is disposed inside the collision cell 132.

The ion guide 134 transports ions discharged from the collision cell 132 to a subsequent stage while focusing the ions in the vicinity of the ion optical axis C. The multipole ion guide 133 is usually made of metal. In many cases, stainless steel is used. A metal material plated with gold or platinum is preferably used. In addition, a heater 1331 for heating the multipole ion guide 133 is connected to the multipole ion guide 133. The temperature sensor 1321 and the heater 1331 may be disposed at appropriate positions as long as the purpose of measuring the temperature inside the collision cell 132 and the purpose of heating the inside of the collision cell 132 to a predetermined temperature can be achieved.

Figure 2:
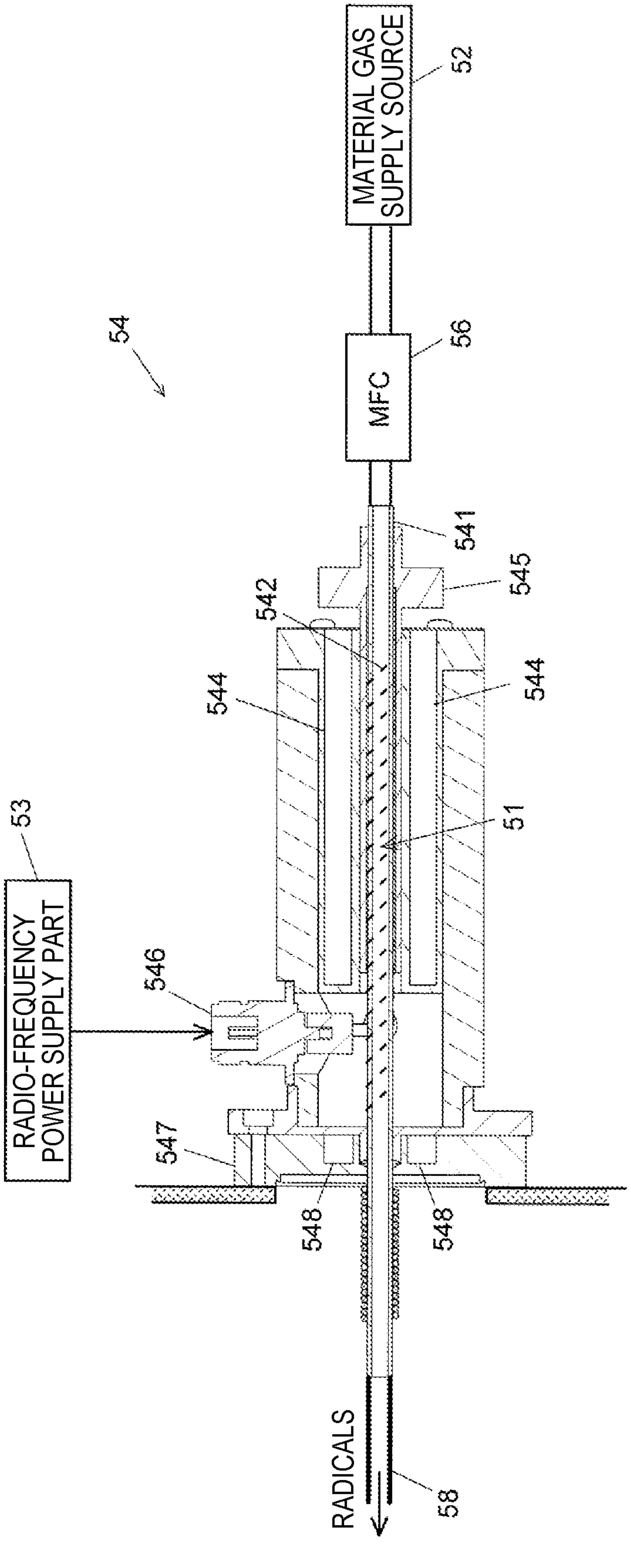
FIG. 2 is a configuration diagram of a radical generation part provided in the mass spectrometer of the present embodiment.

A radical supply part 5 is connected to the collision cell 132. FIG. 2 illustrates a detailed configuration of the radical supply part 5. The radical supply part 5 includes a radical source 54 in which a radical generation chamber 51 is formed inside, a vacuum pump (not illustrated) that exhausts the radical generation chamber 51, a material gas supply source 52 that supplies gas (material gas) as a material of radicals, and a radio-frequency power supply part 53. A mass-flow controller (MFC) 56 for adjusting a flow rate of the material gas is provided in a flow path from the material gas supply source 52 to the radical generation chamber 51. As the material gas, a material gas corresponding to the type of radicals to be generated is used. For example, water vapor, an oxygen gas, a nitrogen gas, a hydrogen gas, carbon dioxide, and air, may be used.

The radical source 54 has a tubular body 541 made of a dielectric material. An internal space of the tubular body 541 serves as the radical generation chamber 51. A plunger 545 fixes the tubular body 541 in a state in which the tubular body 541 is inserted into a hollow cylindrical magnet 544. A helical antenna 542 (broken line in FIG. 2) is wound around the outer periphery of a portion located inside the magnet 544 of the tubular body 541.

In addition, the radical source 54 is provided with a radio-frequency power input part 546. The radio-frequency power supply part 53 supplies radio-frequency power to the radio-frequency power input part 546. The radical source 54 further includes a flange 547 for fixing a tip portion of the radical source 54. The flange 547 accommodates a hollow cylindrical magnet 548 having the same diameter as the magnet 544 and forming a pair with the magnet 544. The magnets 544 and 548 generate a magnetic field inside the tubular body 541 (radical generation chamber 51) to easily generate and maintain plasma by the action.

A transport pipe 58 for transporting radicals generated in the radical generation chamber 51 to the collision cell 132 is connected to an outlet end of the radical source 54. The transport pipe 58 is preferably an insulating pipe, and for example, a quartz glass pipe or a borosilicate glass pipe can be used.

The analysis chamber 14 includes: an ion transport electrode 141 for transporting the incident ions from the third intermediate vacuum chamber 13; an orthogonal acceleration electrode 142 including a pair of an expulsion electrode 1421 and an attraction electrode 1422 disposed in such a manner as to face each other across the incident optical axis of the ions (an orthogonal acceleration area); an acceleration electrode 143 for accelerating the ions ejected to a flight space by the orthogonal acceleration electrode 142; a reflectron electrode 144 for forming a return path for the ions within the flight space; an ion detector 145; and a flight tube 146 configured to define the periphery of the flight space. The orthogonal acceleration electrode 142 deflects a traveling direction of the ions having entered the analysis chamber 14 toward the flight space. The ions with the deflected traveling direction are accelerated by the acceleration electrode 143 to enter the flight space and fly along the return path for a flight time corresponding to the mass-to-charge ratio of each ion, and are then detected by the ion detector 145.

The control/processing part 7 controls operations of each part described above and has functions of storing data obtained by the ion detector 145 and creating and analyzing a chromatogram and a mass spectrum. The control/processing part 7 includes a storage part 71, and further includes a measurement condition setting part 72 and a measurement control part 73 as functional blocks. An entity of the control/processing part 7 is a general computer, and each of the above-described functional blocks is embodied by a processor executing a mass analysis program installed in advance. In addition, an input part 8 including a mouse, a keyboard, or the like and a display part 9 including a liquid crystal display or the like are connected to the control/processing part 7.

For each of a plurality of target compounds, the storage part 71 stores a method file describing measurement parameters (a retention time of the target compound, the type of radicals used and generation conditions of them, mass-to-charge ratios of precursor ions, and the like) in measuring the target compound. The generation conditions of radicals include the type, flow rate, and the like of the material gas used for generating the radicals. In addition, for each of a plurality of types of radicals, the storage part 71 stores information (heater power information) in which the flow rate of the material gas used for generating this type of radicals, the amount of electric power supplied to the heater 1331 when the material gas is supplied at the flow rate, and timings to start and stop the supply of the amount of electric power are associated with each other. FIG. 3 is an example of the heater power information. The above timings to start and stop the supply of the amount of electric power are set with respect to the time of starting the supply of the material gas and the time of stopping the supply of the material gas. Specifically, for example, it is set such that the supply of the material gas is started after the elapse of a first time (for example, 30 seconds) from the start of the supply of the amount of electric power described above, and the supply of the material gas is stopped after the elapse of a second time (for example, 1 minute) from the stop of the supply of the amount of electric power described above.

Figure 4:
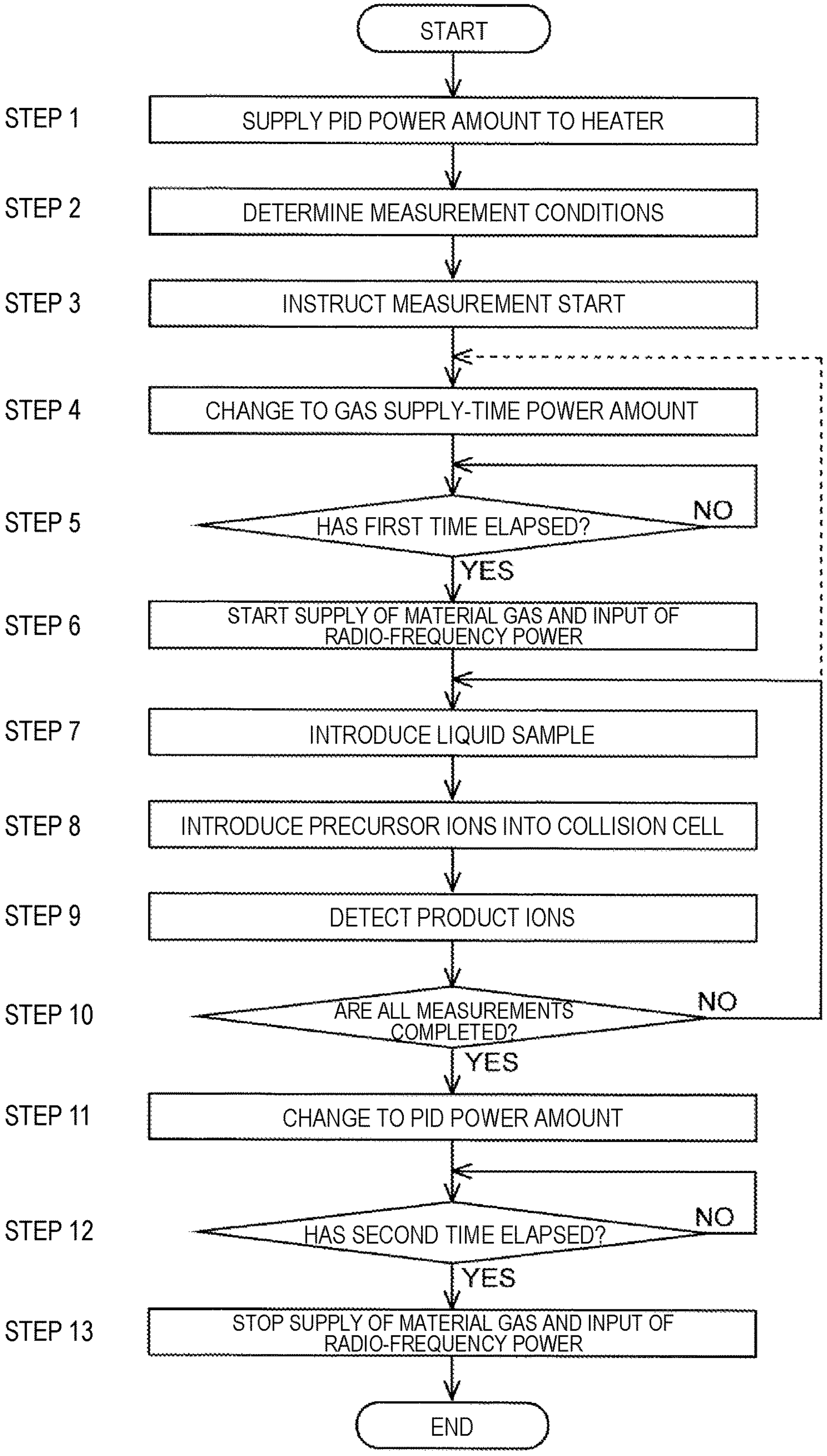
FIG. 4 is a flowchart of one embodiment of the mass spectrometry method according to the present invention.

Next, a procedure for an analysis using the liquid chromatograph mass spectrometer 100 of the present embodiment will be described as an example of the mass spectrometry method according to the present invention. FIG. 4 is a flowchart showing the procedure of the analysis. The liquid chromatograph mass spectrometer 100 of the present embodiment performs control (proportional-integral-differential control: PID control) so that electric power is supplied from a power source 137 to the heater 1331 also in a time period (standby time) in which no analysis is performed to maintain the inside of the collision cell 132 at a predetermined temperature (for example, 130° C.) while the main body is powered on (step 1). Hereinafter, the amount of electric power supplied at this time is also referred to as PID power amount. The PID power amount changes according to a difference between the temperature measured by the temperature sensor 1321 and the above predetermined temperature.

When a user gives an instruction to start analysis by a predetermined input operation, the measurement condition setting part 72 displays a screen for setting measurement conditions on a screen of the display part 9. When the user designates a target compound using the screen, the measurement condition setting part 72 reads the measurement parameters of the target compound from the storage part 71, and displays the measurement parameters on the screen of the display part 9 together with the heater power information (the amount of electric power to be supplied to the heater 1331 and the timings to start and stop the supply of the amount of electric power) corresponding to the type of radicals and the generation conditions (the type, flow rate, and the like of the material gas) included in the measurement parameters. The user checks the displayed contents, and changes the measurement parameters or the amount of electric power supplied to the heater 1331 as necessary. When the user determines the measurement conditions including the measurement parameters and the amount of electric power (step 2), the measurement condition setting part 72 creates a batch file reflecting these pieces of information and stores the batch file in the storage part 71. In a case where the measurement using the same measurement parameters or the like has been performed in the past, the user may designate the batch file stored in the storage part 71. Hereinafter, the amount of electric power determined here is also referred to as gas supply-time power amount. Here, the user is caused to check and determine the measurement conditions including the measurement parameters and the amount of electric power supplied to the heater 1331. However, the checking and determining step by the user may be omitted, and the batch file may be created using the previously stored data as it is.

After that, when the user sets a liquid sample in the autosampler 24 and gives an instruction to start measurement (step 3), the measurement control part 73 controls the operation of each part on the basis of the contents described in the batch file and executes a measurement operation as follows.

First, the amount of electric power supplied from the power source 137 to the heater 1331 is changed from the PID power amount to the gas supply-time power amount (step 4). Here, it is described that the PID power amount is changed to the gas supply-time power amount. However, in practice, it is conceivable to supply, to the heater 1331, an amount of electric power obtained by increasing or decreasing (offsetting) a predetermined amount of electric power from the PID power amount according to the gas supply-time power amount during gas supply while continuously performing the PID control itself also during gas supply. That is, in a case where the PID control is cancelled during gas supply, the gas supply-time power amount may be set as an absolute value, or in a case where the PID control is continued also during gas supply, the gas supply-time power amount may be set as an offset amount from the PID power amount.

When the first time described in the batch file has elapsed after the change to the gas supply-time power amount (YES in step 5), the material gas supply source 52 introduces the material gas into the radical generation chamber 51, and the radio-frequency power supply part 53 inputs radio-frequency power to the helical antenna 542 (step 6). As a result, plasma is generated inside the radical generation chamber 51 to generate radicals from the material gas. The radicals generated in the radical generation chamber 51 pass through the transport pipe 58 to flow into the collision cell 132.

Subsequently, the liquid sample set in the autosampler 24 is introduced into the injector 22 of the liquid chromatograph 2 (step 7). The liquid sample introduced into the injector 22 is introduced into the column 23 along a mobile phase flow, separated into compounds inside the column 23, and sequentially introduced into the ESI probe 101.

Ions of the target compound generated in the ESI probe 101 are drawn into the first intermediate vacuum chamber 11 through the heated capillary 102 by a pressure difference between the ionization chamber 10 and the first intermediate vacuum chamber 11. In the first intermediate vacuum chamber 11, the ion guide 111 focuses the ions in the vicinity of the ion optical axis C. The ions focused in the first intermediate vacuum chamber 11 subsequently enter the second intermediate vacuum chamber 12, are again focused in the vicinity of the ion optical axis C by the ion guide 121, and then enter the third intermediate vacuum chamber 13. In the third intermediate vacuum chamber 13, the quadrupole mass filter 131 selects precursor ions from the ions generated from the target compound. The precursor ions that have passed through the quadrupole mass filter 131 are introduced into the collision cell 132 (step 8).

In the collision cell 132, the radicals supplied from the radical generation chamber 51 through the transport pipe 58 are attached to the precursor ions. As a result, a radical attachment reaction occurs, and the precursor ions are dissociated to generate product ions. Alternatively, adduct ions to which the radicals are attached are generated in some cases. In the following description, the adduct ions are also referred to as product ions.

The ion transport electrode 141 transports the product ions having entered the analysis chamber 14 to the orthogonal acceleration electrode 142. A voltage is applied to the orthogonal acceleration electrode 142 at a predetermined cycle to deflect the flight direction of the ions in a direction substantially orthogonal to the previous direction. The ions with the deflected flight direction are accelerated by the acceleration electrode 143, and ejected to the flight space. The ions ejected to the flight space fly along a predetermined flight path defined by the reflectron electrode 144 and the flight tube 146 for a time corresponding to the mass-to-charge ratio of each ion, to be separated from each other and detected by the ion detector 145 (step 9).

The ion detector 145 outputs a signal having a magnitude corresponding to the incident amount of the ion every time the ion is incident. The output signals from the ion detector 145 are sequentially stored in the storage part 71. The storage part 71 stores measurement data with the time of flight of the ion and the detection intensity of the ion as axes.

When the measurement described in the batch file (in a case where a plurality of measurements are described, all the measurements) has (have) been completed (YES in step 10), the measurement control part 73 changes the amount of electric power supplied from the power source 137 to the heater 1331 from the gas supply-time power amount to the PID power amount (step 11). When the second time described in the batch file has elapsed after the change of the amount of electric power supplied to the heater 1331 to the PID power amount (YES in step 12), the supply of the material gas from the material gas supply source 52 and the supply of the radio-frequency power to the helical antenna 542 are stopped (step 13). In a case where any measurement listed in the batch file has not yet been performed (NO in step 10), the process returns to step 7. Here, it is assumed that the same type of radicals is used under the same conditions for the measurement of all the samples. However, in a case where each sample is irradiated with different types of radicals or is irradiated with the same radicals under different conditions, the process may return to step 4 (indicated by a broken line in FIG. 4).

In the liquid chromatograph mass spectrometer 100 of the present embodiment, the amount of electric power supplied from the power source 137 to the heater 1331 is changed from the PID power amount to the gas supply-time power amount on the basis of the heater power information, and after the elapse of the first time from then, the material gas is supplied to the radical generation chamber 51 and the radio-frequency power is input to the helical antenna 542 to generate the radicals. In addition, after the end of the measurement, the amount of electric power supplied from the power source 137 to the heater 1331 is returned to the PID power amount, and after the elapse of the second time from then, the supply to the radical generation chamber 51 and the input of the radio-frequency power to the helical antenna 542 are stopped.

When the radicals are generated from the material gas, a part of the material gas is radicalized, and the rest remains unreacted. Normally, the material gas has a lower temperature than the temperature inside the collision cell 132 during the PID control. Thus, when the unreacted material gas flows into the collision cell 132, the collision cell 132 is cooled to decrease the inside temperature. When the temperature inside the collision cell 132 decreases, the precursor ions that have entered the collision cell 132 are cooled to decrease their reactivity. As a result, the radical attachment reaction is less likely to occur, the amount of product ions generated decreases, and the measurement sensitivity deteriorates.

On the other hand, in the present embodiment, for each of the plurality of types of radicals, the heater power information is prepared in advance in which the flow rate of the material gas used for generating this type of radicals, the amount of electric power supplied to the heater 1331 when the material gas is supplied at the flow rate, and the timings to start and stop the supply of the amount of electric power are associated with each other, and the amount of electric power supplied from the power source 137 to the heater 1331 is increased from the amount of electric power during the PID control on the basis of the heater power information. Therefore, even when the material gas flows in, the temperature of the collision cell 132 is maintained at the temperature during the PID control, and a desired radical attachment reaction can be efficiently generated.

The above embodiment is merely an example, and can be modified as appropriate in accordance with the spirit of the present invention.

In the above embodiment, plasma is generated to generate the radicals from the material gas, but the method for generating the radicals is not limited to this method. For example, the radicals can also be generated by thermally dissociating the material gas. In this case, the material gas heated to a higher temperature than the collision cell 132 under the PID control flows into the collision cell 132 to heat the collision cell 132. Therefore, in this case, the gas supply-time power amount may be made smaller than the PID power amount.

In the above measurement example, the temperature of the collision cell 132 is PID-controlled by supplying the PID power amount to the heater 1331 also during non-measurement. However, in a case where the inside of the collision cell 132 is less likely to be contaminated, it is not necessary to supply electric power to the heater 1331 during non-measurement. In addition, in the above embodiment, the gas supply-time power amount is always supplied to the heater 1331 during measurement. However, it is sufficient to prevent the precursor ions from being cooled at least in a time period in which both the precursor ions and the radicals are introduced into the collision cell 132, that is, in a time period in which the product ions are generated by the radical attachment reaction, and the gas supply-time power amount may be supplied only in this time period.

The above embodiment assumes a case where there is a possibility that a timing at which the radicals are generated is delayed with no plasma being generated immediately after the start of the supply of the material gas to the radical generation chamber 51 and the supply of the radio-frequency power to the helical antenna 542, and generates the radicals from the material gas and supplies the radicals to the collision cell 132 at all times during measurement. However, in some cases, the radicals can be generated immediately after the start of the supply of the material gas to the radical generation chamber 51 and the supply of the radio-frequency power to the helical antenna 542 depending on the type of radicals and the generation conditions. Alternatively, the transport pipe 58 may be provided with a switching valve capable of switching between a flow path for introducing the radicals generated in the radical generation chamber 51 into the collision cell 132 and a flow path for discharging the radicals to the outside. In these cases, it is possible to immediately introduce the radicals in accordance with a timing at which the precursor ions are introduced into the collision cell 132. That is, since a time period in which the material gas flows into the collision cell 132 together with the radicals is only a part of an entire measurement time (substantially the same time period as a time period in which the precursor ions are introduced into the collision cell 132), it is sufficient to supply the gas supply-time power amount to the heater 1331 only in this time period.

In addition, in the above embodiment, the material gas is supplied to the radical generation chamber 51 after the elapse of the first time from the change of the amount of electric power to the gas supply-time power amount, and the supply of the material gas is stopped after the elapse of the second time from the change of the amount of electric power to the PID power amount. However, in a case where precise temperature control of the collision cell 132 is not required, the change of the amount of electric power and the start/stop of the supply of the material gas may be performed at the same time, or may be performed in the reverse order.

In the above embodiment, the precursor ions and the radicals are introduced into the collision cell 132 to cause the radical attachment reaction. However, a three-dimensional ion trap can be used instead of the collision cell 132. In addition, in the above embodiment, the quadrupole mass filter and the time-of-flight mass separation part are used as a mass separation part, but other types of mass separation parts may be used. In addition, although the liquid chromatograph and the mass spectrometer are combined in the above embodiment, the same configuration as described above can be adopted also in a case where a gas chromatograph and the mass spectrometer are combined or only the mass spectrometer is used.

[Modes]

It is understood by those skilled in the art that the plurality of exemplary embodiments described above are specific examples of the following modes.

(Clause 1)

A mass spectrometry method according to one mode of the present invention is a method for performing mass spectrometry by causing a precursor ion derived from a sample component and a radical to react in a reaction chamber to generate product ions from the precursor ion, the method including:

- a step of generating a radical from a material gas;
- a step of introducing the radical and the precursor ion into the reaction chamber in a state where an amount of electric power corresponding to a generation condition of the radical is supplied to a temperature control part provided in the reaction chamber; and
- a step of separating and detecting product ions generated from the precursor ion in the reaction chamber according to a mass-to-charge ratio.

(Clause 5)

A mass spectrometer according to one mode of the present invention includes:

- a reaction chamber into which a precursor ion is introduced;
- a temperature control part provided in the reaction chamber;
- a power supply part configured to supply electric power to the temperature control part;
- a radical generation part configured to generate a radical from a material gas to introduce the radical into the reaction chamber;
- a measurement control part configured to control operations of the power supply part and the radical generation part so as to supply, to the temperature control part, an amount of electric power corresponding to a radical generation condition in the radical generation part in a time period in which the radical is introduced into the reaction chamber;
- a mass separation part configured to separate product ions generated from the precursor ion in the reaction chamber according to a mass-to-charge ratio; and
- an ion detection part configured to detect product ions separated by the mass separation part.

In the mass spectrometry method of clause 1 and the mass spectrometer of clause 5, the amount of electric power corresponding to the radical generation condition is supplied to the temperature control part in the time period in which the radical is introduced into the reaction chamber into which the precursor ion is introduced. For example, in a case where a low-temperature material gas flows into the reaction chamber together with the radical, the amount of electric power supplied to the temperature control part is increased. In a case where a material gas having a temperature higher than the above predetermined temperature flows into the reaction chamber together with the radical, the amount of electric power supplied to the temperature control part is decreased. In the mass spectrometry method of clause 1 and the mass spectrometer of clause 5, when the radical is supplied to the reaction chamber, the amount of electric power corresponding to the radical generation condition is supplied to the temperature control part to compensate for a temperature change in the reaction chamber due to the material gas flowing into the reaction chamber together with the radical. This makes it possible to reduce an undesired temperature change in the reaction chamber during radical supply.

(Clause 2)

In a mass spectrometry method according to clause 1, a predetermined amount of electric power is supplied to the temperature control part to maintain the reaction chamber at a predetermined temperature in a time period before a start of measurement and/or after an end of measurement, and the amount of electric power supplied to the temperature control part is changed to the amount corresponding to the radical generation condition in a part or all of a time period during measurement.

In the mass spectrometry method of clause 2, since the reaction chamber is maintained at the predetermined temperature also in a non-measurement time period, it is possible to inhibit contamination by attachment of various compounds to an electrode or the like constituting the reaction chamber due to a temperature decrease of the reaction chamber in a measurement standby time period.

(Clause 3)

In a mass spectrometry method according to clause 1 or 2,

- the radical generation condition includes a type of the material gas, a type of the radical generated from the material gas, and a flow rate of the material gas.

A rate at which the radical is generated from the material gas in the radical generation part depends on a combination of the type of the material gas and the radical. In addition, the amount of material gas flowing into the reaction chamber depends on the flow rate of the material gas supplied to the radical generation chamber. In the mass spectrometry method of clause 3, since the amount of electric power corresponding to the radical generation condition including the type of the material gas, the type of the radical generated from the material gas, and the flow rate of the material gas is supplied to the temperature control part, the temperature of the reaction chamber can be controlled with higher accuracy.

(Clause 4)

In a mass spectrometry method according to any one of clauses 1 to 3,

- in a time period in which the radical is introduced into the reaction chamber, the amount of electric power corresponding to the radical generation condition is supplied to the temperature control part regardless of whether or not the precursor ion is introduced.

In the mass spectrometry method according to clause 4, the temperature of the reaction chamber can be kept constant regardless of whether or not the precursor ion is introduced into the reaction chamber. Therefore, it is possible to inhibit the contamination of the electrode or the like constituting the reaction chamber due to a temperature decrease of the reaction chamber.

REFERENCE SIGNS LIST

100 . . . Liquid Chromatograph Mass Spectrometer
1 . . . Mass Spectrometer
10 . . . Ionization Chamber
101 . . . ESI Probe
102 . . . Heated Capillary
11 . . . First Intermediate Vacuum Chamber
111 . . . Ion Guide
112 . . . Skimmer
12 . . . Second Intermediate Vacuum Chamber
121 . . . Ion Guide
13 . . . Third Intermediate Vacuum Chamber
131 . . . Quadrupole Mass Filter
132 . . . Collision Cell
1321 . . . Temperature Sensor
133 . . . Multipole Ion Guide
1331 . . . Heater
134 . . . Ion Guide
14 . . . Analysis Chamber
141 . . . Ion Transport Electrode
142 . . . Orthogonal Acceleration Electrode

1421 . . . Expulsion Electrode
1422 . . . Attraction Electrode
143 . . . Acceleration Electrode
144 . . . Reflectron Electrode
145 . . . Ion Detector
146 . . . Flight Tube
2 . . . Liquid Chromatograph
5 . . . Radical Supply Part
51 . . . Radical Generation Chamber
52 . . . Material Gas Supply Source
53 . . . Radio-Frequency Power Supply Part
54 . . . Radical Source
541 . . . Tubular Body
542 . . . Helical Antenna
544 . . . Magnet
545 . . . Plunger
546 . . . Radio-Frequency Power Input Part
547 . . . Flange
548 . . . Magnet
58 . . . Transport Pipe
7 . . . Control/Processing Part
71 . . . Storage Part
72 . . . Measurement Condition Setting Part
73 . . . Measurement Control Part
8 . . . Input Part
9 . . . Display Part
C . . . Ion Optical Axis

The invention claimed is:

1. A mass spectrometry method for performing mass spectrometry by causing a precursor ion derived from a sample component and a radical to react in a reaction chamber to generate product ions from the precursor ion, the method comprising:

a step of generating a radical from a material gas;

a step of introducing the radical and the precursor ion into the reaction chamber in a state where an amount of electric power corresponding to a generation condition of the radical is supplied to a temperature control part provided in the reaction chamber; and a step of separating and detecting product ions generated from the precursor ion in the reaction chamber according to a mass-to-charge ratio.

2. The mass spectrometry method according to claim 1, wherein a predetermined amount of electric power is supplied to the temperature control part to maintain the reaction chamber at a predetermined temperature in a time period before a start of measurement and/or after an end of measurement, and the amount of electric power supplied to the temperature control part is changed to the amount corresponding to the radical generation condition in a part or all of a time period during measurement.

3. The mass spectrometry method according to claim 1, wherein the radical generation condition includes a type of the material gas, a type of the radical generated from the material gas, and a flow rate of the material gas.

4. The mass spectrometry method according to claim 1, wherein in a time period in which the radical is introduced into the reaction chamber, the amount of electric power corresponding to the radical generation condition is supplied to the temperature control part regardless of whether or not the precursor ion is introduced.

5. A mass spectrometer comprising:

a reaction chamber into which a precursor ion is introduced;

a temperature control part provided in the reaction chamber;

a power supply part configured to supply electric power to the temperature control part;

a radical generation part configured to generate a radical from a material gas to introduce the radical into the reaction chamber;

a measurement control part configured to control operations of the power supply part and the radical generation part so as to supply, to the temperature control part, an amount of electric power corresponding to a radical generation condition in the radical generation part in a time period in which the radical is introduced into the reaction chamber;

a mass separation part configured to separate product ions generated from the precursor ion in the reaction chamber according to a mass-to-charge ratio; and an ion detection part configured to detect ions separated by the mass separation part.

6. The mass spectrometer according to claim 5, wherein the reaction chamber is a collision cell.

* * * * *